Figure 1:
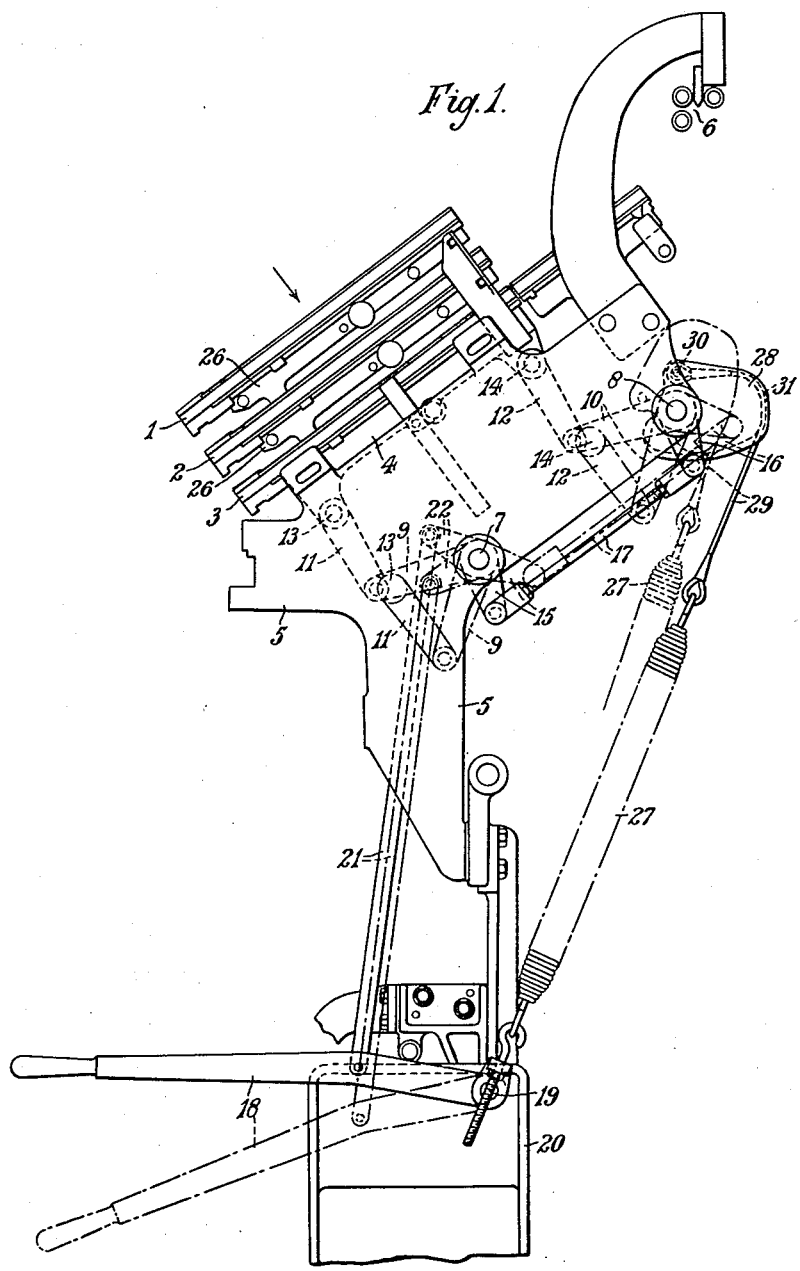

Oct. 20, 1936. W. F. GORSE 2,057,775
MAGAZINE OF TYPOGRAPHICAL COMPOSING MACHINES
Filed July 3, 1935 2 Sheets-Sheet 1

INVENTOR.
W.F. GORSE

Attorneys
Morrison Kennedy Campbell

Oct. 20, 1936.  W. F. GORSE  2,057,775
MAGAZINE OF TYPOGRAPHICAL COMPOSING MACHINES
Filed July 3, 1935  2 Sheets—Sheet 2
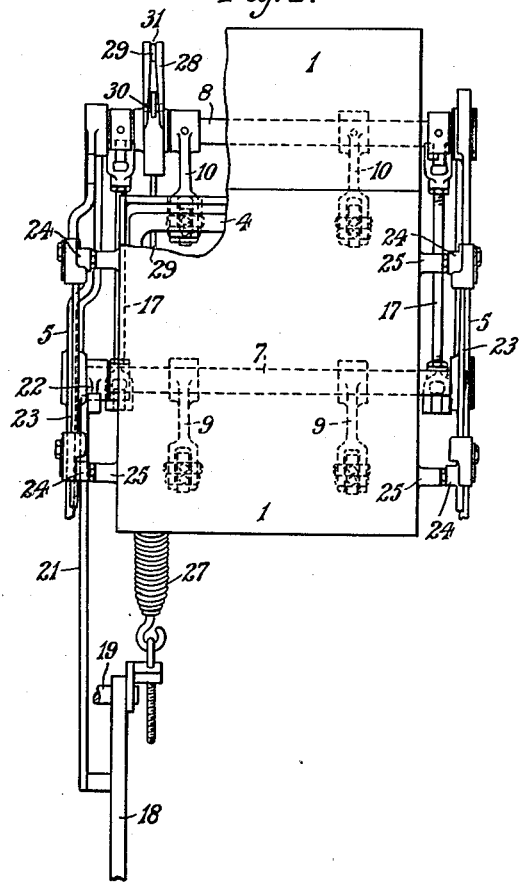
INVENTOR.
W.F. GORSE
Attorneys Patented Oct. 20, 1936

2,057,775

UNITED STATES PATENT OFFICE 2,057,775

MAGAZINE OF TYPOGRAPHICAL COMPOSING MACHINES

William Fairall Gorse, Altrincham, England, assignor to Linotype and Machinery Limited, London, England, a limited liability company Application July 3, 1935, Serial No. 29,727
In Great Britain July 4, 1934

3 Claims. (Cl. 199—45)

This invention relates to typographical composing machines, comprising a plurality of superposed magazines which are adjustable as a whole to bring any desired magazine or magazines into operative position in relation to either the assembling or distributing mechanisms or both said mechanisms.

In machines of this kind it has been proposed to provide means for counterbalancing the weight of the magazines so as to reduce to a minimum the power required for shifting them, said means comprising a shaft tending to turn in one direction under the weight of the magazines and in the opposite direction under the action of a spring or springs. Moreover, with a view to compensating for variations in the force exerted by the spring or springs in different positions of the magazines, the counterbalancing force has been applied, always in substantially the same direction, to the end of a crank arm fast to the said shaft, the effective length of the crank arm thus varying in accordance with its angular position. The effective length of the crank arm and the force exerted by the spring do not, however, vary in the same ratio for a given movement of the magazines, so that only an approximation to the desired result is attained.

It has further been proposed to apply the counterbalancing force to the shaft through a chain connected to one end of a lever arm fast on the shaft and provided with a cam which moves into and out of engagement with the chain during the movement of the magazines so as to vary the effective point of connection of the chain to the lever arm, but with this construction, the limited range of movement of the lever arm did not permit the variations in its effective length to bear a sufficiently close relationship to the changes in the counterbalancing force.

The object of the present invention is to provide an improved counterbalancing mechanism of simple construction the use of which ensures a more accurate compensation for variations in the counterbalancing force throughout the range of movement of the magazines, than has been heretofore attained.

In carrying out the invention, a counterbalancing spring acts directly and continuously on the periphery of a cam mounted directly on a shaft which tends to turn under the weight of the magazines, through a flexible connection passing over and secured to the cam, the form of the cam being such that the point at which the force of the spring is applied to the cam is subject to a continuous variation, as regards its distance from the axis of the shaft, without any material change in angular position relatively to the shaft.

The invention is hereinafter more particularly described with reference to the accompanying drawings, in which:—

Figure 1 is a side elevation of the pertinent parts of a machine embodying one constructional form of the invention, indicating two different positions of the magazine adjusting mechanism, and Figure 2 is a plan, as viewed in the direction of the arrow in Figure 1, partly broken away.

The drawings illustrate the invention as applied to a column of three auxiliary magazines 1, 2, 3 of the form usually employed at the side of a column of main magazines in multiple magazine machines. The magazines are supported on a shift frame 4 adjustable relatively to the machine frame 5 to bring a selected magazine into operative relationship with the distributor 6 at the upper end of the magazine column, and with the assembler (not shown) at the lower end thereof.

The magazine shift mechanism comprises two transversely located shafts 7, 8 turning in fixed bearings in the machine frame 5, each having fast thereon a pair of arms 9, 10 pivotally connected by links 11, 12 to shafts 13, 14 extending transversely across the underside of the magazine shift frame 4.

By means of a pair of arms 15, 16 respectively fast on the shafts 7, 8 and adjustable links 17 connecting the said arms, the shaft 8 is turned simultaneously with the shaft 7 when the latter is actuated to effect a magazine change by the hand lever 18. The hand lever 18 is pivoted to a stub shaft 19 secured to the base frame 20 and actuates the shaft 7 through a link 21 and an arm 22 fast on the shaft 7.

The different operative positions of the magazine column are determined by magazine locating bars 23 formed with lugs 24 engaging rollers on studs 25 extending laterally from the respective magazine base frames 26, said locating bars being adjusted into and out of engagement with the rollers by means, not shown, associated with the hand lever 18.

As so far described, the magazine adjusting mechanism is of known form.

According to the constructional form of the invention illustrated, the spring 27 employed for counterbalancing the weight of the magazine column is, at its lower end, anchored to the base frame 20, conveniently by a connection to the before-mentioned stub shaft 19, and its upper end is connected to a cam 28 fast on the shaft 8 by a cable 29. The point 30 at which the cable is connected to the cam is so located that in all positions of the cam the cable engages within a peripheral groove 31 thereon, whereby the counterbalancing force always acts substantially tangentially to the curve of the cam, and its turning moment on the shaft is exerted along different radii of the cam throughout its range of movement, always at substantially the same angle to the direction of application of the force.

Moreover, the form of the cam surface is such that throughout the range of its movement the length of the radius determining the turning moment exerted on the shaft by the spring varies substantially inversely to the variations of the pull of the spring, due to its extension and contraction, with a modification of the true inverse ratio to compensate for the minor differences in the counter-clockwise turning moment (as viewed in Figure 1) exerted by the weight of the magazines due to variations in the position of the linkage mechanism. By this arrangement, therefore, the counterbalancing effect is maintained uniform throughout the total movement of the magazines.

The action will be understood by reference to Figure 1 in which the relative positions of the cam, spring and magazines, when the lowermost magazine 3 is in the operative position, are indicated in full lines, and the positions of the cam, spring and linkage mechanism when the uppermost magazine 1 is in the operative position are indicated by dot-and-dash lines.

It is to be noted that the particular form of magazine adjusting mechanism herein described and illustrated in the drawings is chosen merely as a convenient example, and that the counterbalancing device according to the invention, embodying a cam through which the counterbalancing force is compensated in the manner described, may be adopted in conjunction with magazine adjusting devices of any desired construction.

Having described my invention, I declare that what I claim and desire to secure by Letters Patent is:—

1. In a typographical composing machine, the combination with a plurality of magazines adjustable columnwise to bring a selected magazine into operative position, of means adapted to counterbalance the magazines comprising a shaft tending to turn under the weight of the magazines, a continuous peripheral cam fast on said shaft, a counterbalancing spring, a flexible transmission member secured at respectively opposite ends to said cam and spring and engaging the periphery of the cam throughout its range of movement whereby a counterbalancing force is applied to the cam at varying distances from the axis of the shaft in a direction bearing a substantially constant angular relationship to the radius of the cam extending from the axis of the shaft to the point of application of the force.

2. In a typographical composing machine, the combination with a plurality of magazines adjustable columnwise to bring a selected magazine into operative position, of means adapted to counterbalance the magazines comprising a shaft tending to turn under the weight of the magazines, a continuous peripheral cam fast on said shaft, a counterbalancing spring, a flexible transmission member secured at respectively opposite ends to the cam and spring and engaging the periphery of the cam throughout its range of movement, the curvature of the cam being such that the force of the spring is applied to the cam at distances from the axis of the shaft varying substantially inversely to the variations in the pull of the spring.

3. A combination according to claim 2, including linkage mechanism between the shaft and the magazines, and wherein the curvature of the cam serves to maintain constant the relationship between the turning moments exerted on the shaft by the spring through the cam and by the magazines through the linkage mechanism respectively.

WILLIAM FAIRALL GORSE.